Dec. 31, 1968   J. J. McDERMOTT ET AL   3,419,231
AIRCRAFT ARRESTING SYSTEM
Filed Jan. 23, 1967
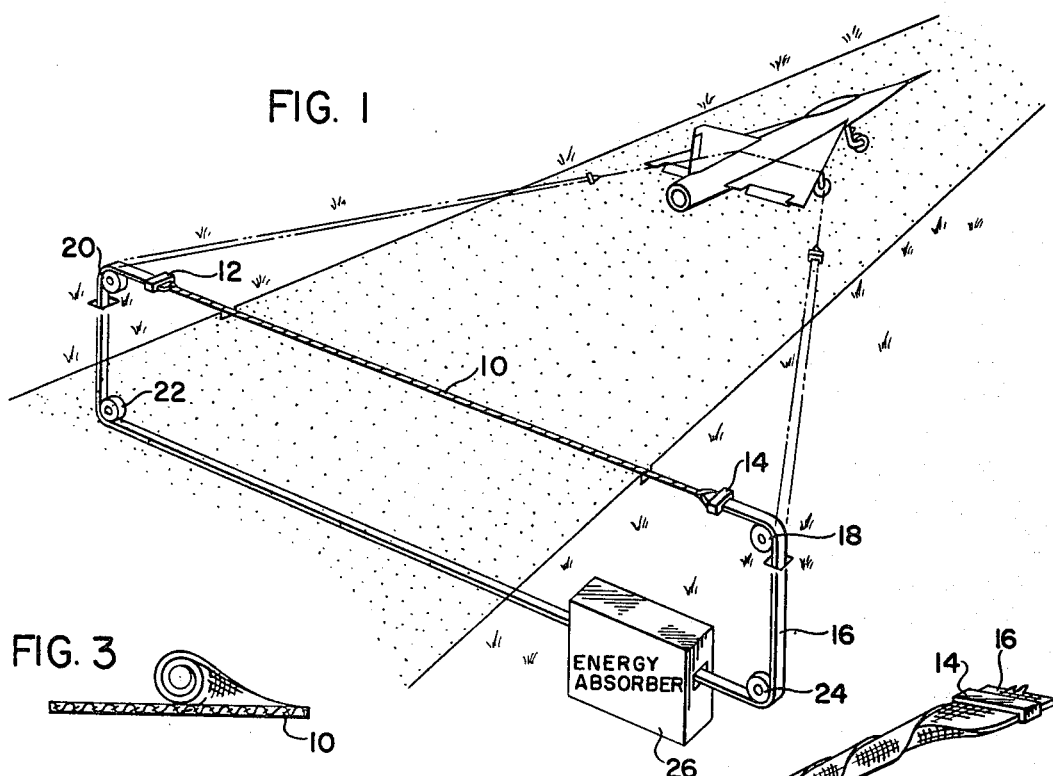
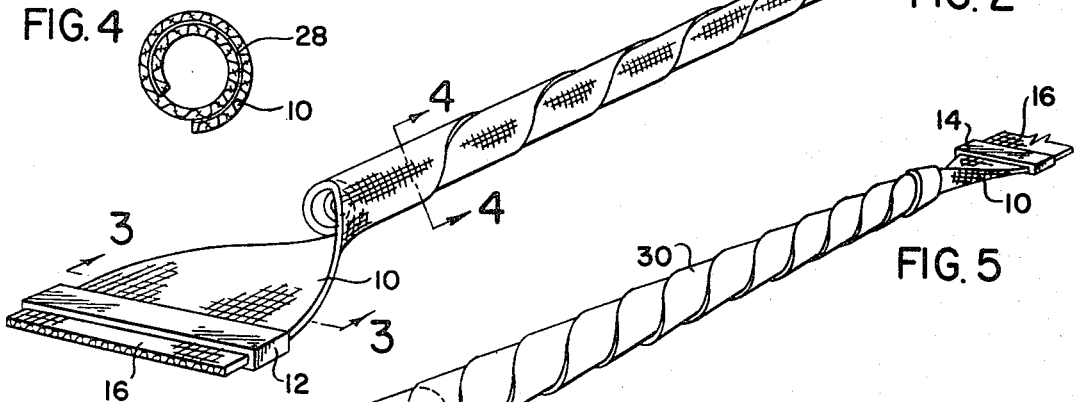
INVENTORS.
JOHN J. McDERMOTT &
CHARLES S. THOMPSON
BY
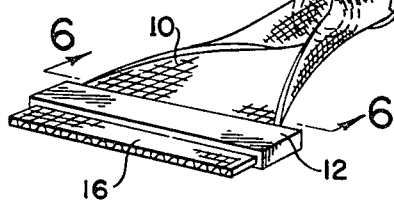
ATTORNEYS

3,419,231
AIRCRAFT ARRESTING SYSTEM

John J. McDermott, Springfield, Pa., and Charles S. Thompson, Vincentown, N.J., assignors to E. W. Bliss Company, Canton, Ohio, a corporation of Delaware
Filed Jan. 23, 1967, Ser. No. 610,969
4 Claims. (Cl. 244—110)

ABSTRACT OF THE DISCLOSURE

An aircraft arresting system has a pendant comprising a woven tape of synthetic fibers wrapped about itself to provide an elongated line of substantially circular cross-section.

---

This invention relates to the art of vehicle arresting gear, and more particularly to an improved aircraft arresting system.

The present invention is particularly applicable to arresting aircraft, and it will be described with particular reference thereto; however, it will be appreciated that the invention has broader applications and may be used in various other vehicle arresting systems.

U.S. Reissue Patent 25,406 to Byrne et al., describes an aircraft arresting system comprising an aircraft engaging pendant spanning a pair of deck sheaves located on opposite sides of a runway, an energy absorber, and a woven tape of synthetic fiber attached to the ends of the pendant and engaging the energy absorber. The interposition of a woven tape element having a low modulus of elasticity between the pendant and energy absorber, advantageously alleviates high initial stress in the pendant and in the entire arresting system.

This prior art system uses a wire cable as the pendant, which tends to offset some of the advantages obtained by employing the woven tape element. Thus, the wire cable imposes on the system a limited aircraft pendant engaging velocity due to the high elastic modulus of wire cable; a relatively high weight to strength ratio; and a possible source of damage to the aircraft when arresting contact is made. Moreover, a wire cable is susceptible to corrosion and kinking with usage, reducing its service for life.

These and other disadvantages of the prior art have been overcome by the present invention which is directed to an aircraft arresting system utilizing a length of woven tape as a runway pendant.

In accordance with the present invention, there is provided, in an aircraft arresting system including a runway pendant, an energy absorber, and means for transmitting energy from said pendant to said energy absorber; an improved pendant comprising a woven tape of synthetic fibers wrapped about itself to provide an elongated element of substantially circular cross-section.

Thus, an object of the present invention is to provide an improved aircraft arresting system which obviates the disadvantages of a wire cable pendant.

A further object of the invention is to provide a runway pendant for an aircraft arresting system having a low elastic modulus and a capability for satisfactory operation at high engaging velocities.

Another object of the invention is to provide a runway pendant for an aircraft arresting system which is resistant to corrosion and kinking, and is likely to do less damage than wire cable to aircraft surfaces if contact is made during arresting engagement.

These and other objects and advantages will become apparent from the following detailed description of a preferred embodiment of the invention, when read in connection with the accompanying drawings, in which:

FIGURE 1 is a schematic, pictorial view, of a preferred embodiment of the present invention;
FIGURE 2 is a schematic, pictorial view, showing a specific embodiment of a runway pendant;
FIGURE 3 is a schematic, section view taken generally along line 3—3 of FIGURE 2;
FIGURE 4 is a schematic, section view taken generally along line 4—4 of FIGURE 2;
FIGURE 5 is a schematic, pictorial view of a second specific embodiment of a runway pendant; and
FIGURE 6 is a schematic, section view taken generally along line 6—6 of FIGURE 5.

Referring now to the drawings, wherein the showings are for purposes of illustrating preferred embodiments of the invention only and not for the purpose of limiting the same, FIGURE 1 shows a runway installed aircraft arresting system comprising runway pendant 10, joined at its ends by connectors 12 and 14 to energy transmitting means, showed in the preferred form as woven tape 16. Woven tape 16 travels around deck sheaves 18 and 20, auxiliary sheaves 22 and 24, and into engagement with energy absorber 26. The energy absorber per se is not a novel part of the present invention and accordingly has not been detailed. Such devices are known in the art. Reference may be had to the aforementioned U.S. Patent Re. 25,406 for embodiments of energy absorbers useful in the practice of the present invention.

FIGURES 2, 3 and 4 show a specific embodiment of runway pendant 10 in accordance with the present invention. In this embodiment, pendant 10 consists of a woven tape of synthetic fibers, wrapped about itself in a spiral configuration. The angle of spiraling is not critical, and thus, the convolutions of wrapping, forming the pendant can be parallel to any plane rotated less than 90° and more than 0° with respect to the cross-sectional plane of the pendant.

The convolutions of wrapping, which as best seen in FIGURES 3 and 4, form an elongated element of generally circular cross-section, may be secured to each other by adhesive cement 28, as shown in FIGURE 4, by stitching, or by any other suitable fastening means.

FIGURES 5 and 6 show a second embodiment of the invention wherein pendant 10 is augmented by a separate piece of synethetic fiber woven tape 30 wrapped around and secured to pendant 10, in a reverse spiral direction. In the preferred arrangement shown in the drawings, the convolutions of wrapping formed by separate piece of woven tape 30 are parallel to the same plane as the convolutions forming pendant 10. It will be understood, however, that this need not be the case. The convolutions of wrapping formed by separate piece of woven tape 30 may be parallel to a different plane than are the convolutions of wrapping, forming pendant 10. The convolutions of wrapping formed by separate piece of woven tape may be secured to pendant 10 by adhesive cement, stitching or any other suitable fastening means.

The woven tape used in the practice of the present invention is preferably formed from synthetic fibers such as nylon or rayon. More generally, any synthetic fiber or mixture of fibers possessing properties approximating or exceeding those of nylon in terms of strength, modulus of elasticity, resistance to moisture, rot and mildew, etc., can be used in fabrication of woven tapes suitable in the practice of the present invention.

As detailed in the aforementioned U.S. Patent Re 25,406 a particularly suitable tape is one utilizing a weave comprising transverse and longitudinal strands of synthetic fibers wherein each and every longitudinal strand is coterminous with the length of the tape. (The contemplated lengths of the tapes are in the neighborhood of 500 to 1,000 feet, and longer) and extend substantially longitudinally thereof each strand being relatively straight and parallel to each other longitudinal strand.

The present invention has been described in conjunction with certain structural embodiments; however, it is to be appreciated that various structural changes may be made in the illustrated embodiments. For instance, the woven tape forming the runway pendant and/or the separate piece of woven tape covering, may be wrapped about itself in such fashion that the convolutions are parallel to the cross-sectional plane of the elongated element they form. Other such modifications will readily occur to one skilled in the art.

Having thus described our invention, we claim:

1. In an aircraft arresting system including a runway pendant, an energy absorber and means for transmitting energy from said pendant to said energy absorber; an improved pendant comprising a woven tape of synthetic fibers wrapped about itself to provide an elongated element of substantially circular cross-section.

2. The device of claim 1 in which the convoltuions of wrapping are parallel to a plane rotated less than 90° but more than 0° with respect to the cross-sectional plane of said elongated element.

3. In an aircraft arresting system including a runway pendant, an energy absorber and means for transmitting energy from said pendant to said energy absorber; an improved pendant comprising a woven tape of synthetic fibers wrapped about itself to provide an elongated element of substantially circular cross section, and a separate piece of synthetic fiber woven tape wrapped around and secured to said elongated element.

4. The aircraft arresting system as defined in claim 3, wherein said first mentioned woven tape is spirally wound in a first direction and said separate piece of woven tape is spirally wound in a reverse direction.

References Cited
UNITED STATES PATENTS

| | | |
|---|---|---|
| 1,870,275 | 8/1932 | Adams. |
| 3,136,021 | 6/1964 | Hoffstrom. |
| 3,139,249 | 6/1964 | Trifillis. |
| 3,333,310 | 8/1967 | Lagarde et al. |

MILTON BUCHLER, *Primary Examiner.*

P. E. SAUBERER, *Assistant Examiner.*

U.S. Cl. X.R.

139—420